United States Patent
Bajar et al.

(10) Patent No.: US 8,694,769 B2
(45) Date of Patent: *Apr. 8, 2014

(54) SYSTEM AND METHOD FOR CONTROLLING DATA COMMUNICATIONS BETWEEN A SERVER AND A CLIENT DEVICE

(75) Inventors: Dave Bajar, Kitchener (CA); Philip Chi-Jim Luk, Thornhill (CA); Michael Kenneth Brown, Fergus (CA); Darrell Reginald May, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 88 days.

This patent is subject to a terminal disclaimer.

(21) Appl. No.: 13/327,891

(22) Filed: Dec. 16, 2011

(65) Prior Publication Data

US 2012/0089840 A1   Apr. 12, 2012

Related U.S. Application Data

(63) Continuation of application No. 13/024,634, filed on Feb. 10, 2011, now Pat. No. 8,099,592, which is a continuation of application No. 11/346,255, filed on Feb. 3, 2006, now Pat. No. 7,904,709.

(51) Int. Cl.
*H04L 9/08* (2006.01)

(52) U.S. Cl.
USPC ........... 713/150; 713/151; 713/152; 713/153; 713/165; 380/259; 380/270; 380/277; 380/278; 380/284; 709/237

(58) Field of Classification Search
USPC ................. 713/150–153, 165; 380/259, 270, 380/277–286; 709/237
See application file for complete search history.

(56) References Cited

U.S. PATENT DOCUMENTS

| 5,442,703 A | 8/1995 | Kim et al. |
| 5,546,464 A | 8/1996 | Raith et al. |

(Continued)

FOREIGN PATENT DOCUMENTS

| CA | 2575622 | 4/2012 |
| EP | 1253797 | 10/2002 |

(Continued)

OTHER PUBLICATIONS

European Communication Under Rule 51(4) EPC, Application No. 06101249.8, dated Sep. 21, 2007.

(Continued)

*Primary Examiner* — Andrew L Nalven
*Assistant Examiner* — Amir Mehrmanesh
(74) *Attorney, Agent, or Firm* — Bereskin & Parr LLP/S.E.N.C.R.L., s.r.l.

(57) ABSTRACT

A system and method for controlling data communications between a server and a client device, such as a mobile device. Embodiments relate generally to a technique where stop data is provided to the client device. This stop data can be transmitted (e.g. by the client device) to the server. When processed by the server, the stop data indicates to the server that at least some of the encrypted data received by the client device from the server was not decrypted using the second key (e.g. as may be the case when the second key has been deleted). Upon receiving the stop data, the server may, for example, withhold the transmission of data encrypted with the first key to the client device until the second key is restored on the client device. In one embodiment, the stop data is provided to the client device in an encoded (e.g. encrypted) form.

23 Claims, 5 Drawing Sheets

(56) References Cited

U.S. PATENT DOCUMENTS

| | | | |
|---|---|---|---|
| 5,757,911 | A | 5/1998 | Shibata |
| 7,904,709 | B2 | 3/2011 | Bajar et al. |
| 8,099,592 | B2 | 1/2012 | Bajar et al. |
| 2002/0073229 | A1 | 6/2002 | Hayashi |
| 2003/0002642 | A1 | 1/2003 | Jorasch et al. |
| 2004/0071293 | A1 | 4/2004 | Yamamichi et al. |
| 2004/0196978 | A1 | 10/2004 | Godfrey et al. |
| 2005/0216735 | A1 | 9/2005 | Huang |
| 2006/0143462 | A1 | 6/2006 | Jacobs |

FOREIGN PATENT DOCUMENTS

| | | |
|---|---|---|
| EP | 1816822 | 3/2008 |
| GB | 2414145 | 11/2005 |

OTHER PUBLICATIONS

Canadian First Office Action, Application No. 2,576,622, dated Feb. 8, 2010.

European Search Report, Application No. 06101249.8, dated Jul. 11, 2006.

United States Notice of Allowance, U.S. Appl. No. 11/346,255, dated Nov. 8, 2010.

United States Office Action Response and Request for Continued Examination, U.S. Appl. No. 11/346,255, dated Oct. 4, 2010.

United States Office Action, U.S. Appl. No. 11/346,255, dated Aug. 4, 2010.

United States Office Action Response, U.S. Appl. No. 11/346,255, dated May 25, 2010.

United States Office Action, U.S. Appl. No. 11/346,255, dated Feb. 26, 2010.

United States Office Action Response and Request for Continued Examination, U.S. Appl. No. 11/346,255, dated Feb. 12, 2010.

United States Office Action Response, U.S. Appl. No. 11/346,255, dated Jan. 18, 2010.

United States Office Action, U.S. Appl. No. 11/346,255, dated Nov. 18, 2009.

United States Office Action Response, U.S. Appl. No. 11/346,255, dated Sep. 8, 2009.

United States Office Action, U.S. Appl. No. 11/346,255, dated Jun. 9, 2009.

United States Advisory Action Befoe the Filing of an Appeal Brief, U.S. Appl. No. 11/346,255, dated Jan. 29, 2010.

European Deciision to Grant, Application No. 06101249.8, dated Feb. 28, 2008.

United States Patent No. 7,904,709 entitled "System and Method for Controlling Data Communications Between a Server and a Client Device", issued Mar. 8, 2011.

Co-pending U.S. Appl. No. 13/024,634 entitled, "System and Method for Controlling Data Communications Between a Server and a Client Device", filed Jun. 9, 2011.

Canadian Office Action, Application No. 2,576,622, dated Jun. 3, 2011.

Applicant's Interview Summary, U.S. Appl. No. 13/024,634, dated Sep. 1, 2011.

Terminal Disclaimer, U.S. Appl. No. 13/024,634, dated Sep. 1, 2011.

Examiner's Interview Summary, U.S. Appl. No. 13/024,634, dated Sep. 22, 2011.

Notice of Allowance, U.S. Appl. No. 13/024,634, dated Sep. 22, 2011.

EP Response to European Search Report/Written Opinion for EP Patent No. 1,816,822, filed on Sep. 19, 2006.

Canadian Notice of Allowance, Application No. 2,576,622, dated Jan. 5, 2012.

SYSTEM AND METHOD FOR CONTROLLING DATA COMMUNICATIONS BETWEEN A SERVER AND A CLIENT DEVICE

CROSS-REFERENCE TO RELATE APPLICATIONS

This application is a continuation of, and claims priority to, prior U.S. patent application Ser. No. 13/024,634, filed on Feb. 10, 2011, which is a continuation of U.S. patent application Ser. No. 11/346,255, filed on Feb. 3, 2006, and issued to U.S. Pat. No. 7,904,709. The entire contents of U.S. patent application Ser. No. 13/024,634 and U.S. patent application Ser. No. 11/346,255 are hereby incorporated by reference.

TECHNICAL FIELD

Embodiments described herein relate generally to client-server data communications, and more specifically to a system and method for controlling encrypted data communications between devices.

BACKGROUND OF THE INVENTION

Some devices, including some mobile devices for example, receive data that may be pushed to them by a server. For example, a system may comprise a central message server that receives messages, such as electronic mail ("e-mail") messages, addressed to a number of users. The system may, for example, further comprise support components for wireless communications such as a message management server, which processes messages that are received at the central message server and pushes the messages to mobile devices operated by the users. Generally, while messages may be stored on the central message server, the message management server may be used more specifically to control when, if, and how messages are to be sent to mobile devices. In this manner, messages may be forwarded to the users of mobile devices as they are received at the central message server, or in accordance with some other predefined schedule, or at some predefined interval, for example.

Where a server, such as the message management server, is adapted to push message data or other data to a mobile device, in some known implementations, the data is transmitted to the mobile device via a shared network infrastructure (e.g. the public Internet) and a wireless network. Such transmissions may be susceptible to interception and unauthorized access. In order to protect the confidentiality of these transmissions, data may be encrypted at the server prior to transmission, to be subsequently decrypted after the data is received at the mobile device. A key that is capable of decrypting encrypted data received from the server is usually stored on the mobile device. The key is typically downloaded to the mobile device during a synchronization process with a desktop computer, or when the mobile device is initially made ready for use, for example.

In the event that the key required to decrypt encrypted data received from the server is deleted, or becomes otherwise inaccessible, the received encrypted data cannot be decrypted until access to the key is restored. Furthermore, the server, unaware that the key has been deleted from the mobile device or has become otherwise inaccessible, may continue to push encrypted data to the mobile device. However, if, for example, the mobile device has been configured to discard data that it cannot decrypt, some data transmitted by the server to the mobile device may be lost.

BRIEF DESCRIPTION OF THE DRAWINGS

For a better understanding of embodiments of the systems and methods described herein, and to show more clearly how they may be carried into effect, reference will now be made, by way of example, to the accompanying drawings in which.

DETAILED DESCRIPTION

Figure 1:
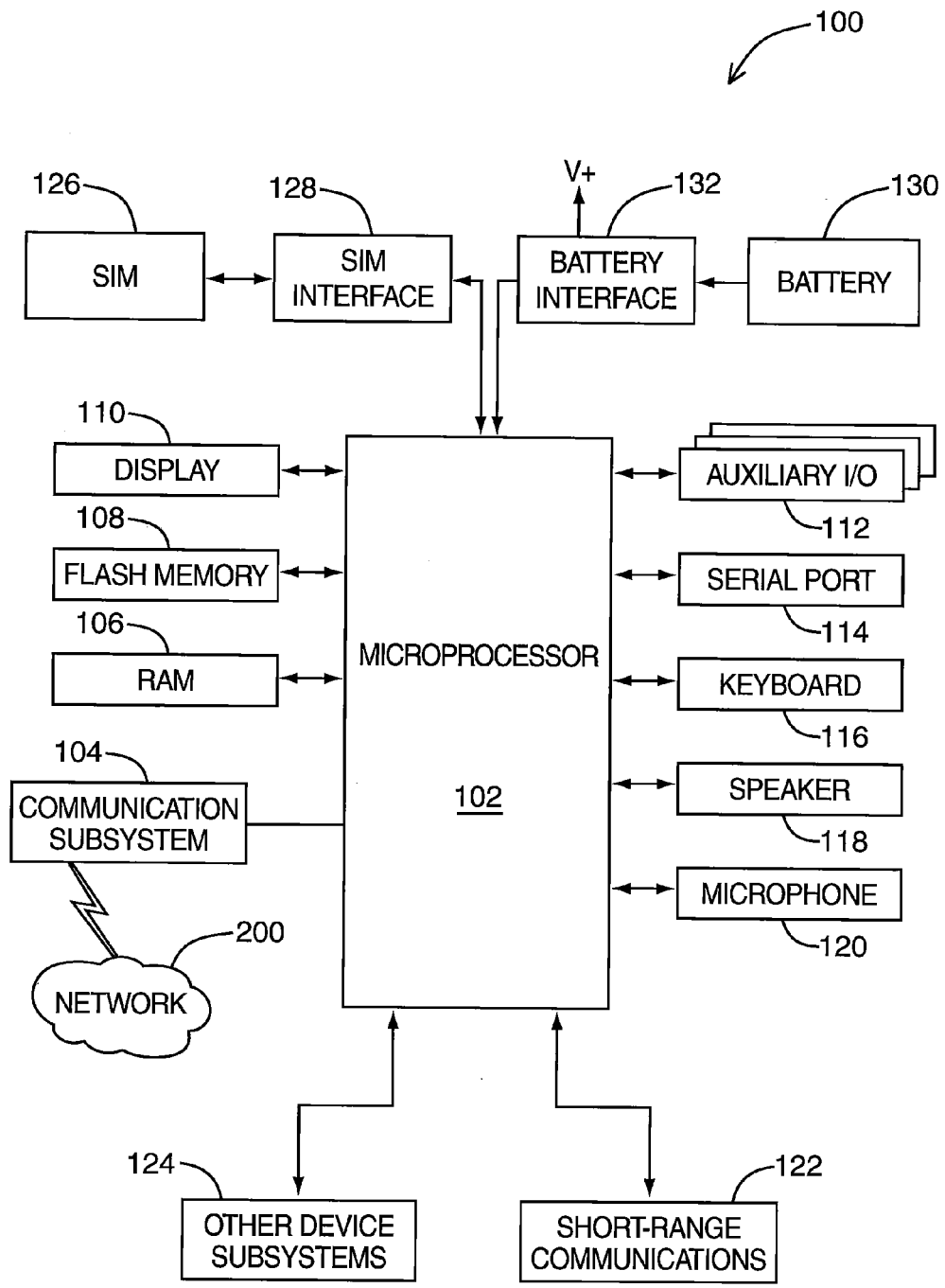
FIG. 1 is a block diagram of a mobile device in one example implementation.

Embodiments of systems and methods described herein relate generally to data communication between a server and a client device (e.g. a mobile device), where the server is adapted to encrypt data using a first key, and to transmit encrypted data to the client device for decryption using a second key. In one example embodiment, the data is encrypted using a symmetric encryption technique, and accordingly, the first key for encrypting data and the second key for decrypting data may be the same.

More specifically, embodiments of systems and methods described herein relate generally to a technique where stop data, which when processed by the server, indicates to the server that there is at least some encrypted data that has been received by the client device from the server which could not be decrypted using the second key (e.g. as may be the case when the second key has been deleted from a key store on the client device). This stop data can be transmitted (e.g. by the client device) to the server. Upon receiving the stop data, the server may, for example, withhold the transmission of data encrypted with the first key to the client device until the second key is restored on the client device. Alternatively, for example, the server may retransmit certain data to the client device once the second key is restored on the client device or once a new set of keys for encoding and/or decoding data communications is provided to the server and client device.

In one broad aspect, there is provided a method of controlling data communications between a server and a client device, wherein the server is adapted to encrypt data using a first key and transmit encrypted data to the client device for decryption using a second key, the method comprising the steps of: providing stop data which, when processed by the server, indicates to the server that encrypted data received by the client device from the server was not decrypted using the second key; receiving, at the client device, encrypted data from the server; attempting, at the client device, to decrypt encrypted data received at the receiving step using the second key; and if the encrypted data was not decrypted using the second key, transmitting the stop data to the server for processing.

In another broad aspect, the stop data that is transmitted to the server is encoded (e.g. encrypted). This may provide protection against denial of service attacks on the client device, for example.

In another broad aspect, a data index (e.g. a packet identifier) that identifies encrypted data that could not be decrypted using the second key is transmitted with the stop data to the server. This may facilitate the retransmission of data to the client device that might have been lost, for example.

Features of these and other aspects, and of a number of embodiments of system and methods are described below.

Embodiments of the systems and methods described herein make reference to a client device. In some embodiments, the client device is a mobile device. A mobile device is a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 2:
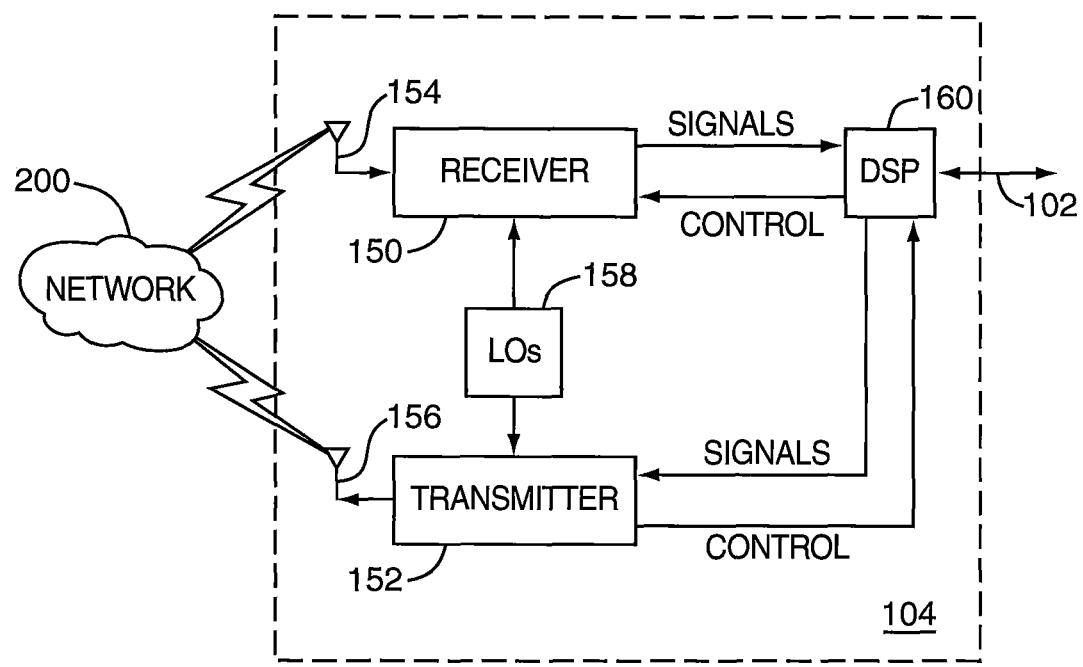
FIG. 2 is a block diagram of a communication subsystem component of the mobile device of FIG. 1.
Figure 3:
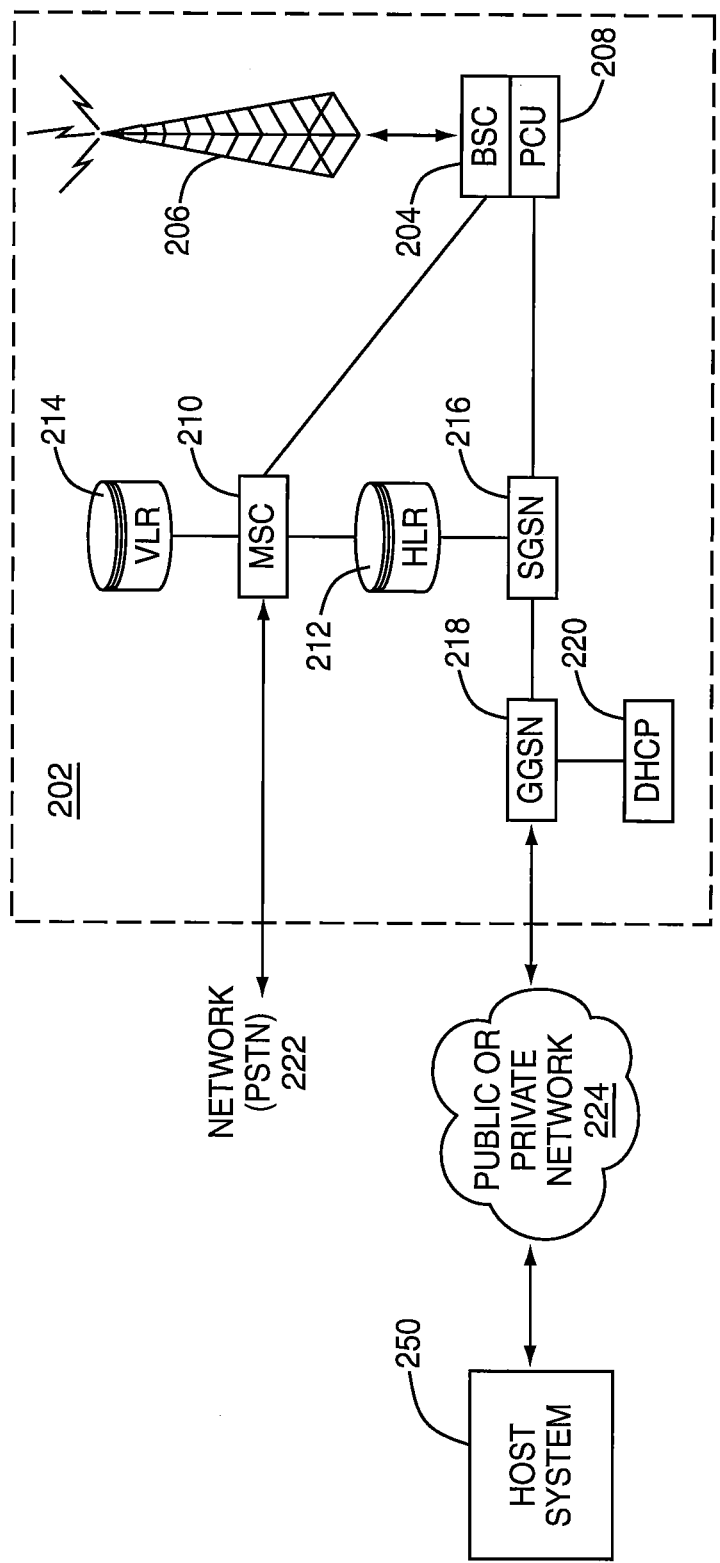
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOS) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (DIA) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
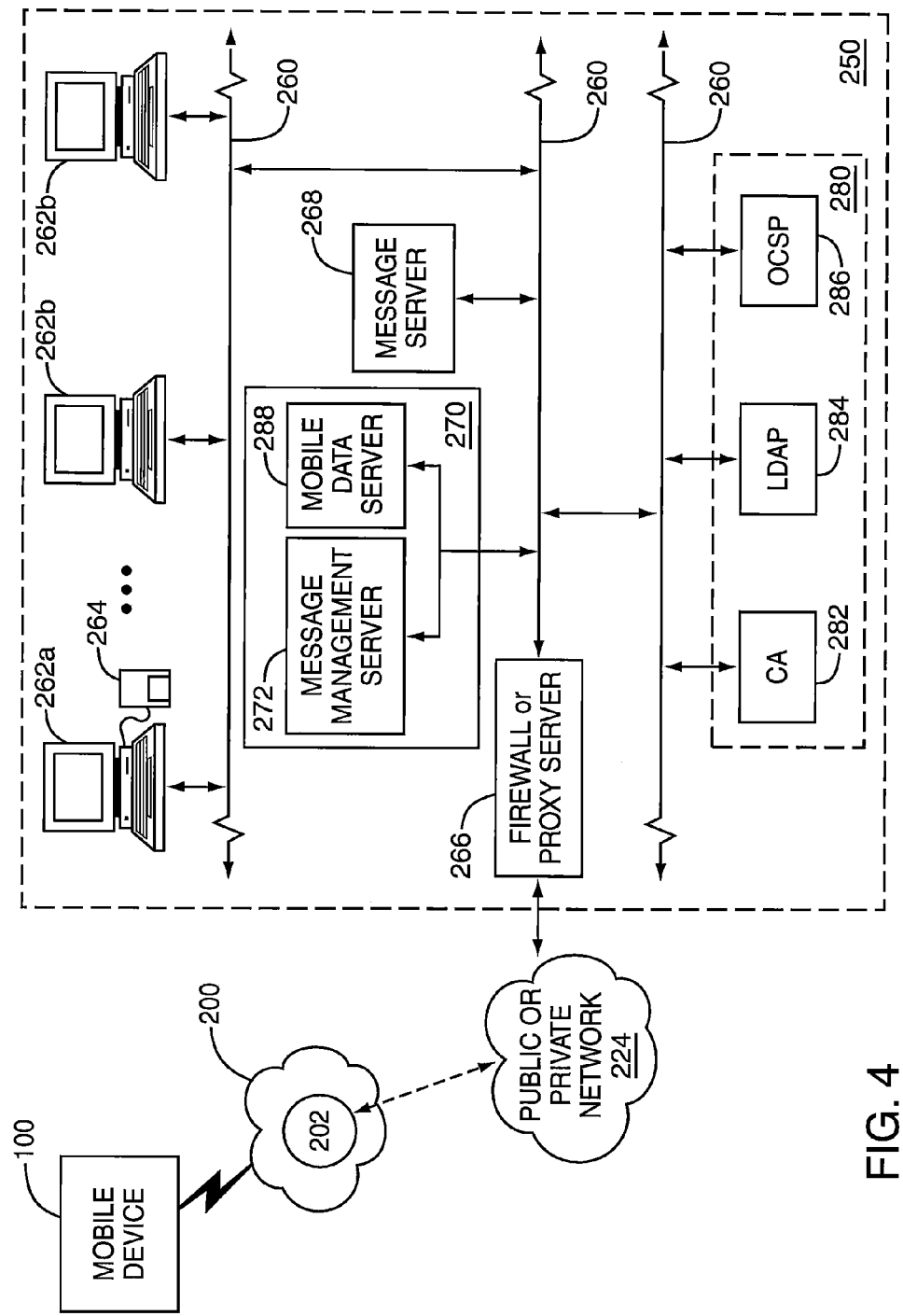
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computing device ("desktop computer") 262a with an accompanying cradle 264 for the user's mobile device 100 is situated on LAN 250. Cradle 264 for mobile device 100 may be coupled to computer 262a by a serial or a Universal Serial Bus (USB) connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates often performed in initializing mobile device 100 for use. The information downloaded to mobile device 100 may include certificates used in the exchange of messages. The process of downloading information from a user's desktop computer 262a to the user's mobile device 100 may also be referred to as synchronization.

It will be understood by persons skilled in the art that user computers 262a, 262b will typically be also connected to other peripheral devices not explicitly shown in FIG. 4. Furthermore, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages would then typically be retrieved from message server 268 and stored locally on computer 262a.

When operating mobile device 100, the user may wish to have e-mail messages retrieved for delivery to the handheld. An e-mail client application operating on mobile device 100 may also request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 comprise a message management server 272, for example. Message management server 272 is used to specifically provide support for the management of messages, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, reformat the composed messages if desired so that they will appear to have originated from the user's computer 262a, and reroute the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices needs to be supported.

Certificates may be used in the processing of encoded messages, such as e-mail messages. An encoded message may be an encrypted message, or a digitally signed message, for example. While Simple Mail Transfer Protocol (SMTP), RFC822 headers, and Multipurpose Internet Mail Extensions (MIME) body parts may be used to define the format of a typical e-mail message not requiring encoding, Secure/MIME (S/MIME), a version of the MIME protocol, may be used in the communication of encoded messages (i.e. in secure messaging applications). S/MIME enables end-to-end authentication and confidentiality, and provides data integrity and privacy from the time an originator of a message sends a message until it is decoded and read by the message recipient. Other known standards and protocols may be employed to facilitate secure message communication, such as Pretty Good Privacy™ (PGP), variants of PGP such as OpenPGP, and others known in the art.

Secure messaging protocols such as S/MIME rely on public and private encryption keys to provide confidentiality and integrity, and on a Public Key Infrastructure (PKI) to communicate information that provides authentication and authorization. Data encrypted using a private key of a private key/public key pair can only be decrypted using the corresponding public key of the pair, and data encrypted using a public key of a private key/public key pair can only be decrypted using the corresponding private key of the pair. Private key information is never made public, whereas public key information is shared.

An encoded message may be encrypted, signed, or both encrypted and signed. The authenticity of public keys used in these operations is validated using certificates. A certificate is a digital document issued by a certificate authority (CA). Certificates are used to authenticate the association between users and their public keys, and essentially provides a level of trust in the authenticity of the users' public keys. Certificates contain information about the certificate holder, with certificate contents typically formatted in accordance with an accepted standard (e.g. X.509). The certificates are typically digitally signed by the certificate authority.

User computers 262a, 262b can obtain certificates from a number of sources, for storage on computers 262a, 262b and/or mobile devices (e.g. mobile device 100). These certificate sources may be private (e.g. dedicated for use within an organization) or public, may reside locally or remotely, and may be accessible from within an organization's private network or through the Internet, for example. In the example shown in FIG. 4, multiple PKI servers 280 associated with the organization reside on LAN 250. PKI servers 280 include a CA server 282 for issuing certificates, a Lightweight Directory Access Protocol (LDAP) server 284 used to search for and download certificates (e.g. for individuals within the organization), and an Online Certificate Status Protocol (OCSP) server 286 used to verify the revocation status of certificates.

Embodiments of systems and methods are described herein that relate generally to data communications between a server (e.g. message management server 272 of FIG. 4) and a client device (e.g. mobile device 100 of FIG. 4). These data communications are typically encrypted to protect the confidentiality of data transmitted between the server and the client device.

As further examples, the server may be a message server 268 (FIG. 4), a mobile data server 288 (FIG. 4), or some other data server coupled (e.g. via one or more network or other data connections) to the client device.

In particular, before data is transmitted by the server to the client device, it may be encrypted with a first key accessible to the server. The first key is typically stored on the server. When the client device receives the encrypted data from the server, the client device decrypts the data with a second key accessible to the client device. The second key is typically stored on the client device, in a key store. The key may have been downloaded to the client device during synchronization (e.g. via cradle 264 of FIG. 4 coupled to a desktop computer 262a of FIG. 4) or at a time when the client device is initially made ready for use, for example. The first and second keys are related to each other, such that data encrypted with the first key can only be decrypted with the second key.

A symmetric encryption technique, such as DES or Triple DES for example, may be employed. In that case, the first and second keys are symmetric keys, and represent the same key (i.e. the same key is used to encrypt or decrypt data).

Alternatively, a public key encryption technique may be employed, where the first and second keys may form a private key/public key pair associated with the client device. For example, data to be transmitted by the server to the client device is encrypted using the first key, which is a public key of the client device. The encrypted data can only be decrypted using the second key, which is a corresponding private key of the client device, expected to be known only to the client device. A separate private key/public key pair associated with the server may also exist, where the public key may be used to encrypt data to be transmitted by the client device to the server and where the corresponding private key may then be used to decrypt that data at the server, for example.

Other encryption techniques may be applied to secure communications between the server and the client device.

It will be understood that data communications between the server and the client device may be encrypted without specific regard to the nature of the type of data being communicated. For example, the data being communicated between the server and the client device may comprise message data associated with a message (e.g. an e-mail message) that is addressed to a user of the client device, and that message may or may not itself be encrypted (or signed). The keys used to encrypt data communications between the server and client device are to be distinguished from the keys associated with particular individuals that might have been used to encode specific messages being transmitted as part of those data communications. It will be understood that depending on the particular system and the role of the server vis-à-vis that of the client device, data communicated between the server and the client device will not be limited to message data, but may also, or alternatively, comprise one or more other types of data.

When data encrypted with a first key is transmitted by the server to the client device, and subsequently received by the client device, the client device will first attempt to decrypt the data so that it can be further processed at the client device. This typically requires the corresponding second key to be retrieved from a key store on the client device for use in decrypting the encrypted data.

Where the second key is initially stored on the client device, in certain situations, the second key may subsequently be deleted from the client device, or become otherwise inaccessible, thereby resulting in the client device being unable to decrypt the encrypted data. Such situations may arise when, for example, new applications are loaded onto the client device, the operating system or other applications on the client device are updated, the client device is re-initialized so that it may be used by a different user, or in other situations where a secure "wipe" of the client device is performed.

When any of these situations arise and result in the deletion of the second key, the client device will be unable to decrypt the received data encrypted with the first key that it has received from the server as well as any additional data encrypted with the first key subsequently received from the server, until the corresponding second key is restored on the client device. Depending on the configuration of the client device, encrypted data received from the server that cannot be decrypted may be automatically deleted at the client device and permanently lost.

In other configurations, data received from the server that cannot be decrypted may instead be stored in a queue. However, if a new key is loaded onto the client device to replace the deleted second key, it will typically not be possible to decrypt the queued data with the new key, and that data may effectively also be lost.

Moreover, in any event, a server that is unaware that the second key has been deleted from the client device or has become otherwise inaccessible may continue to push encrypted data to the client device, despite the fact that the client device cannot decrypt the data. This type of problem may be particularly prevalent in "push-based" environments.

Accordingly, in one broad aspect, at least one embodiment of the systems and methods described herein is directed to means for informing the server that certain encrypted data being transmitted to the client device might not be capable of being decrypted by the client device. The server may then, at its option, withhold the transmission of the certain data to the client device and/or retransmit certain data.

Figure 5:
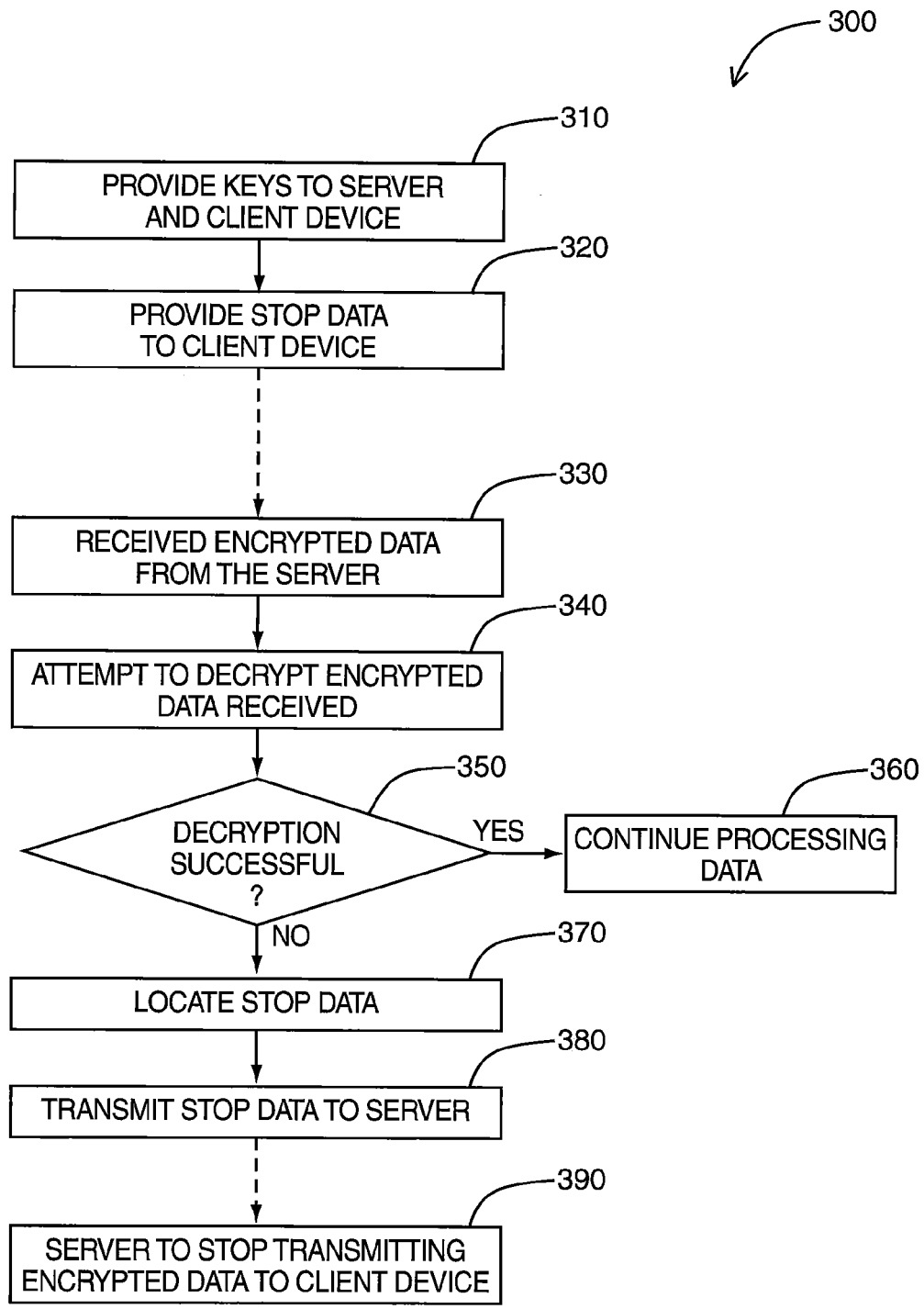
FIG. 5 is a flowchart illustrating steps in a method of controlling data communications between a server and a client device in a number of example embodiments.

Referring to FIG. 5, a flowchart illustrating steps in a method of controlling data communications between a server and a client device in a number of example embodiments is shown generally as 300. Some of the features of method 300 have been described earlier in this description.

At step 310, keys are initially provided to the server (e.g. message management server 272 of FIG. 4) and the client device (e.g. mobile device 100 of FIG. 4), for use in encoding data communications between the server and the client device. The keys are generally stored for subsequent use, in a key store for example. The key store may be access-controlled (e.g. password-protected), in some implementations.

There are a number of ways that the keys may be provided to the server and the client device after they are generated for use (generating step not explicitly shown).

In particular, it is generally desirable to ensure that when keys are provided to the client device via a data transfer from another device to the client device, that the transfer be performed in a secure manner so as to prevent the keys from being read or copied without authorization during the transfer.

For example, where the client device is a mobile device, the keys provided to the client device at step 310 may be generated by the server or some other device in the system (e.g. host system 250), and then transmitted to a desktop device, from which the keys can be downloaded to a mobile device via a cradle physically connected to the desktop device, or via some other form of private or secured connection.

Alternatively, for example, keys may be generated on each of the server and the client device, based on a shared secret that has previously been securely exchanged between the server and client device.

Other techniques known in the art may be employed to provide keys to the server and client device in a secure manner.

The server is adapted to encrypt data using a first key of the keys provided at step 310, to be transmitted to the client device. After the encrypted data is transmitted by the server to the client device and subsequently received by the client device, an attempt to decrypt the encrypted data at the client device will be made (e.g. see step 340 described below) using a second key of the keys provided at step 310.

If the data transmitted by the server to the client device is encrypted using a symmetric encryption technique, then the first and second keys may be a single key that is used both to encrypt and decrypt data. In that case, data transmitted by the client device to the server may also be encrypted with the second key, for subsequent decryption by the server using the first key.

On the other hand, if the data transmitted by the server to the client device is encrypted using a public key encryption technique, then the first and second key may be a public and private key respectively, of a public/private key pair associated with the client device. Keys of a separate public/private key pair associated with the server may also be provided at step 310, with the public key of that pair being made accessible to the client device and the private key of that pair being made accessible to the server.

It will be understood that the keys used to encode and decode transmissions by the server to the client device may differ from the keys used to encode and decode transmissions by the client device to the server.

At step 320, stop data is provided to the client device, which can be transmitted to the server at the direction of the client device.

Typically, stop data will be stored directly on the client device. However, in a variant embodiment, stop data may be stored on another device. In that embodiment, when required, the client device may retrieve stop data from the other device for transmission to the server, or may direct that stop data be transmitted by the other device to the server.

Stop data, when received by the server, will indicate to the server that at least some data encrypted with the first key has been received by the client device that could not be decrypted using the second key at the client device. Receipt of the stop data by the server may suggest to the server that any subsequent transmissions of data encrypted with the first key to the client device might also not be capable of being decrypted by the client device. The stop data may be considered to represent a command or request to the server to cease transmitting data encrypted with the first key to the client device. While a server receiving the stop data will typically be configured to honor the request immediately, it may instead ignore the request under certain conditions or perform some other predefined action(s), for example.

The stop data need not be in any particular form (e.g. it can be garbage data), so long as the server can recognize the data as stop data when the server receives it. Typically, however, particularly where the server is adapted to communicate data to multiple client devices, the stop data will need to be encoded by the client device, include some identifier of the client device, or be otherwise associated with the client device in some manner, in order to identify the client device from which the stop data is being transmitted.

In one embodiment, stop data provided to the client device is stored in a non-volatile memory or storage component on the client device. For example, if the client device is a mobile device (e.g. mobile device 100), then the stop data may be stored in FLASH memory (e.g. FLASH memory 108) or in a ROM (not shown).

Data communications made between the server and the client device may be performed in accordance with a packet-based protocol. In this case, the stop data may be contained in a data packet ("stop packet") that is stored on the client device.

In a number of embodiments, stop data is encoded such that it can be subsequently decoded by the server. If the stop data is contained in a stop packet, only the stop data itself may be encoded, or the entire stop packet (which may include other data) may be encoded, for example.

In some embodiments, stop data may be stored in an encrypted form on the client device. In one example embodiment, the key that is to be used to encrypt data transmitted by the client device to the server is also used to encrypt the stop data. In another embodiment, a separate key may be used to encrypt the stop data, with the corresponding key required to decrypt the stop data being provided to the server (e.g. at step 310). By encrypting the stop data to the server, the security of the system is enhanced as it minimizes the risk that an attacker will be able to construct bogus stop data or a bogus stop packet to successfully deny service to the client device.

In a variant embodiment, stop data is stored in a digitally signed form on the client device, such that when the server receives it, the server will be able to verify that the stop data actually originated from the client device, thereby enhancing security of the system.

In embodiments where stop data is stored in an encoded (e.g. encrypted or signed) form on the client device, preferably the encoding is performed prior to storage such that the stop data is stored pre-encoded in a "ready-to-transmit" form, and will not require further processing. This is because the key that is needed to encode the stop data (which in one embodiment is the same key that is used to encrypt data transmitted by the client device to the server) may subsequently become lost or otherwise inaccessible, making it impossible to encrypt the stop data at a later time. Typically, both the keys (at step 310) and the encoded stop data (at step 320) will be provided during the same provisioning process when the client device is initialized (or re-initialized) for use. If the provisioning is performed securely, then the stop data will also be secure, as an attacker would not have access to the key used to encode the stop data in order to construct bogus stop data or a bogus stop packet.

In one embodiment, a key identifier is associated and stored with the stop data. The key identifier identifies the specific stop data stored on the client device that is to be transmitted to the server when the client device encounters encrypted data received from the server that it cannot decrypt with the second key (e.g. because the key has been deleted). For example, the key identifier may identify the second key, which has been deleted or become otherwise inaccessible.

Referring now to step 330, in the regular course of data communications between the server and the client device, the client device receives data encrypted with the first key from the server.

At step 340, the client device attempts to decrypt the encrypted data received from the server at step 330, using the second key that has been provided to the client device at step 310 and that has been typically stored on the client device.

At step 350, if the attempt to decrypt the encrypted data made at step 340 is successful, normal processing of the decrypted data will continue at step 360. After the data is further processed on the client device, data may be transmitted by the client device to the server. In the meantime, additional data may also be received by the client device from the server (e.g. method 300 may be repeated from step 330).

However, if the attempt to decrypt the encrypted data made at step 340 is not successful, which may be the case when the second key is deleted or has become otherwise inaccessible on the client device for example, then at step 370, the stop data that was provided to the client device at step 320 is located. As noted earlier, a key identifier identifying the second key may be used to locate the appropriate stop data that is to be transmitted to the server. As noted with reference to step 320, the stop data will typically be stored on the client device (e.g. in FLASH memory 108 of mobile device 100 or ROM).

Subsequently, at step 380, the stop data located at step 370 is retrieved and transmitted by the client device to the server for processing.

In one embodiment, a data index, such as a packet identifier for example, is also transmitted to the server at step 380. The data index identifies encrypted data received by the client device that could not be decrypted. For example, the data index may indicate the first packet in an indexed series of packets that have been received by the client device that could not be decrypted.

Use of a data index enables the server to identify the data that could not be decrypted (the server may also assume that any subsequent encrypted data transmissions might also not be decrypted), so that when either the original second key is restored on the client device or a new second key is provided to the client device (e.g. when the client device is reprovisioned with new keys), potentially lost data can be retransmitted. Accordingly, recovery of any data transmitted to the client device between the time the second key was determined to be deleted or became otherwise inaccessible and the time the second key is restored or a new second key is provided to the client device is facilitated.

Stop data transmitted at step 380, when processed by the server, indicates to the server that at least some of the data encrypted with the first key has been received by the client device that could not be decrypted using the corresponding second key. Accordingly, as shown at step 390, the server, after receiving the stop data, may be adapted to stop sending data encrypted with the first key, until, for example, the second key is restored on the client device.

It will be understood that different sets of keys may be used to encrypt different types of data (e.g. associated with different services) that is transmitted by the server, and different stop data or packets may be associated with the different data types.

Accordingly, for example, at step 390, the server may stop transmitting data associated with one particular service to the client device upon receiving particular stop data, while the same server may continue to transmit data associated with a different service for which stop data has not been received from the client device.

In one embodiment, the server may be further adapted to ignore repeat instances of the same stop data being received at the server. This may provide enhanced security as it minimizes the risk that an attacker can intercept and retransmit the same stop data to disrupt future transmissions between the server and the client device.

In one embodiment, the server may be further adapted to invalidate the first key once stop data associated with the corresponding second key is received. More specifically, after a second key is determined to have been deleted or otherwise inaccessible on the client device, and the associated stop data is transmitted to the server (step 380), method 300 may be repeated from step 310, wherein new first and second keys to replace the previously provided keys are provided to the server and the client device for use in encoding data communications between them. New stop data may also be provided to the client device at step 320, particularly if the stop data is to be encoded with one of the new keys.

The new keys may be used to encode and decode data that is retransmitted by the server to the client device (step not shown) that may have been lost. In one embodiment, as described above, the data to be retransmitted may be determined based on a data index transmitted with the stop data previously received by the server from the client device.

The steps of the methods described herein may be provided as executable software instructions stored on computer-readable media.

The invention has been described with regard to a number of embodiments. However, it will be understood by persons skilled in the art that other variants and modifications may be made without departing from the scope of the invention as defined in the claims appended hereto.

The invention claimed is:

1. A server comprising a processor and a memory, wherein the processor is configured to:
    encrypt data using a first key, wherein the encrypted data is decryptable using a second key stored on a client device;
    transmit the encrypted data to the client device;
    receive stop data from the client device, wherein the stop data represents a command to the server, and wherein the stop data is pre-encoded using a cryptographic operation;
    determine, based on the stop data, that the encrypted data was not decrypted using the second key by the client device; and
    cease transmitting data encrypted with the first key to the client device.

2. The server of claim 1, wherein a data index identifying the encrypted data that was not decrypted using the second key is received with the stop data.

3. The server of claim 2, wherein the processor is further configured to retransmit data to the client device based on the data index received from the client device.

4. The server of claim 1, wherein the server is configured to decode the stop data.

5. The server of claim 1, wherein the cryptographic operation is digital signing.

6. The server of claim 1, wherein the cryptographic operation is encryption.

7. The server of claim 1, wherein the processor is configured to receive, from the client device, data other than the stop data, and wherein the stop data is encrypted using a same encryption key that is used to encrypt the data other than the stop data.

8. The server of claim 1, wherein the first and second keys comprise symmetric keys.

9. The server of claim 1, wherein the first and second keys comprise a private and public key pair.

10. The server of claim 1, wherein the client device comprises a mobile device.

11. The server of claim 1, wherein the encrypted data transmitted between the client device and the server is transmitted in accordance with a packet-based protocol.

12. A server comprising a processor and a memory, wherein the processor is configured to:
    encrypt data using a first key, wherein the encrypted data is decryptable using a second key stored on a client device;
    transmit the encrypted data to the client device;
    receive stop data from a device remote from both the server and the client device, wherein the stop data represents a command to the server, and wherein the stop data is pre-encoded using a cryptographic operation;
    determine, based on the stop data, that the encrypted data was not decrypted using the second key by the client device; and
    cease transmitting data encrypted with the first key to the client device.

13. A method of controlling data communications between a server and a client device, the method comprising:
    encrypting data using a first key, wherein the encrypted data is decryptable using a second key stored on a client device;
    transmitting the encrypted data from the server to the client device;
    receiving stop data from the client device, wherein the stop data represents a command to the server, and wherein the stop data is pre-encoded using a cryptographic operation;
    based on the stop data, determining, using a processor of the server, that the encrypted data was not decrypted using the second key by the client device;
    ceasing transmission of data encrypted with the first key to the client device.

14. The method of claim 13, wherein a data index identifying the encrypted data that was not decrypted using the second key is received with the stop data.

15. The method of claim 14, further comprising retransmitting data to the client device based on the data index received from the client device.

16. The method of claim 13, further comprising decoding the stop data.

17. The method of claim 13, wherein the cryptographic operation is digital signing.

18. The method of claim 13, wherein the cryptographic operation is encryption.

19. The method of claim 13, further comprising receiving, from the client device, data other than the stop data, and wherein the stop data is encrypted using a same encryption key that is used to encrypt the data other than the stop data.

20. The method of claim 13, wherein the first and second keys comprise symmetric keys.

21. The method of claim 13, wherein the first and second keys comprise a private and public key pair.

22. The method of claim 13, wherein the client device comprises a mobile device.

23. The method of claim 13, wherein the encrypted data transmitted between the client device and the server is transmitted in accordance with a packet-based protocol.

* * * * *